United States Patent
Rajaraman et al.

(10) Patent No.: US 8,855,562 B2
(45) Date of Patent: Oct. 7, 2014

(54) METHOD AND SYSTEM FOR ENABLING DISCOVERY OF SERVICES AND AUTOMATED EXCHANGE OF DATA BETWEEN BLUETOOTH DEVICES

(75) Inventors: Prasanna Rajaraman, Chennai (IN); Sethuraman Ramasundaram, Chennai (IN)

(73) Assignee: Infosys Limited (IN)

(*) Notice: Subject to any disclaimer, the term of this patent is extended or adjusted under 35 U.S.C. 154(b) by 593 days.

(21) Appl. No.: 13/245,067

(22) Filed: Sep. 26, 2011

(65) Prior Publication Data

US 2013/0005257 A1   Jan. 3, 2013

(30) Foreign Application Priority Data

Jun. 29, 2011   (IN) ............ 2195/CHE/2011

(51) Int. Cl.
*H04B 7/00* (2006.01)
*H04W 8/00* (2009.01)
*H04B 17/00* (2006.01)
*H04W 92/18* (2009.01)
*H04W 4/00* (2009.01)
*H04W 84/18* (2009.01)

(52) U.S. Cl.
CPC ........... *H04W 8/005* (2013.01); *H04B 17/0077* (2013.01); *H04W 92/18* (2013.01); *H04W 4/008* (2013.01); *H04W 84/18* (2013.01)
USPC ........................................ 455/41.2

(58) Field of Classification Search
CPC .................................... H04W 8/005
USPC ....................................... 455/41.2
See application file for complete search history.

(56) References Cited

U.S. PATENT DOCUMENTS

2012/0289158 A1* 11/2012 Palin et al. .............. 455/41.2
2013/0005266 A1* 1/2013 Singh ....................... 455/41.2

* cited by examiner

*Primary Examiner* — David Bilodeau
(74) *Attorney, Agent, or Firm* — Cantor Colburn LLP

(57) ABSTRACT

A method and system for enabling discovery of services and automated exchange of data between multiple Bluetooth devices are disclosed. The method includes measuring signal attenuation of a Bluetooth signal between a first Bluetooth device and a second Bluetooth device. The method further includes comparing the signal attenuation with a set of predefined threshold values. The set of predefined threshold values is associated with a set of services. The method also includes activating a corresponding service from among the set of services based on the comparison. Activating the corresponding service enables discovery of the service and automated exchange of data between the first Bluetooth device and the second Bluetooth device.

22 Claims, 3 Drawing Sheets

METHOD AND SYSTEM FOR ENABLING DISCOVERY OF SERVICES AND AUTOMATED EXCHANGE OF DATA BETWEEN BLUETOOTH DEVICES

BACKGROUND

The invention relates generally to Bluetooth devices. In particular, the invention relates to a method and system for enabling discovery of services and automated exchange of data between Bluetooth devices.

Bluetooth is a short range communications technology that enables exchange of data between multiple devices without the need for any connecting cables. Bluetooth devices operate using radio frequency, and therefore, do not have to be in line of sight with each other. Bluetooth has become extremely popular due to its low cost, low power and its robustness. Nowadays, mobile phones, personal digital assistants (PDAs), laptops, digital cameras, and similar electronic devices are all Bluetooth-compatible, which enables easy transfer of data among such devices. Any Bluetooth device, when queried by another Bluetooth device, typically responds by transmitting its device name, device class, and a list of supported services. The responding Bluetooth device may also provide other technical information such as device features, manufacturer, and so forth. The querying Bluetooth device then connects to the responding Bluetooth device using a process called 'pairing', which requires acceptance by users of the two Bluetooth devices, typically through an input mechanism such as a keypad. Once the connection is established, the two Bluetooth devices can exchange data until the Bluetooth devices go out of range or until a user terminates the Bluetooth connection.

As mentioned earlier, a Bluetooth device transmits a list of services when queried by another Bluetooth device. The querying Bluetooth device may then utilize any of the broadcasted services, thereby enabling data transfer. However, if one Bluetooth device wants another Bluetooth device to discover only a few of its supported services, it cannot do so. In other words, there is no restriction on one Bluetooth device to access only selected services supported by another Bluetooth device. Further, as discussed above, user intervention is always required to initiate the data transfer between the two Bluetooth devices, which may cause inconvenience to the user.

Accordingly, there is a need for a method and system for enabling discovery of services supported by Bluetooth devices in a restrictive manner. Further, the method and system should be automated and reduce the manual intervention involved in initiating transfer of data between the Bluetooth devices.

SUMMARY OF THE INVENTION

The present invention relates to a method for enabling discovery of services and automated exchange of data between multiple Bluetooth devices. The method includes measuring signal attenuation of a Bluetooth signal between a first Bluetooth device and a second Bluetooth device. The method further includes comparing the signal attenuation with a set of predefined threshold values. The set of predefined threshold values is associated with a set of services. The method also includes activating a corresponding service from among the set of services based on the comparison. Activating the corresponding service enables discovery of the service and automated exchange of data between the first Bluetooth device and the second Bluetooth device.

The present invention relates to a system for enabling discovery of services and automated exchange of data between multiple Bluetooth devices. The system includes a measurement module for measuring signal attenuation of a Bluetooth signal between a first Bluetooth device and a second Bluetooth device. The system also includes a memory module for storing a set of predefined threshold values and a list specifying a set of services associated with the set of predefined threshold values. The system further includes a control module for comparing the signal attenuation with the set of predefined threshold values. The control module further activates a corresponding service from among the set of services based on the comparison. Activating the corresponding service enables discovery of the service and automated exchange of data between the first Bluetooth device and the second Bluetooth device.

DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

The present invention relates to a method for enabling discovery of services and automated exchange of data between multiple Bluetooth devices. The method includes measuring signal attenuation of a Bluetooth signal between a first Bluetooth device and a second Bluetooth device. The method further includes comparing the signal attenuation with a set of predefined threshold values. The set of predefined threshold values is associated with a set of services. The method also includes activating a corresponding service from among the set of services based on the comparison. Activating the corresponding service enables discovery of the service and automated exchange of data between the first Bluetooth device and the second Bluetooth device.

The present invention relates to a system for enabling discovery of services and automated exchange of data between multiple Bluetooth devices. The system includes a measurement module for measuring signal attenuation of a Bluetooth signal between a first Bluetooth device and a second Bluetooth device. The system also includes a memory module for storing a set of predefined threshold values and a list specifying a set of services associated with the set of predefined threshold values. The system further includes a control module for comparing the signal attenuation with the set of predefined threshold values. The control module further activates a corresponding service from among the set of services based on the comparison. Activating the corresponding service enables discovery of the service and automated exchange of data between the first Bluetooth device and the second Bluetooth device.

Figure 1:
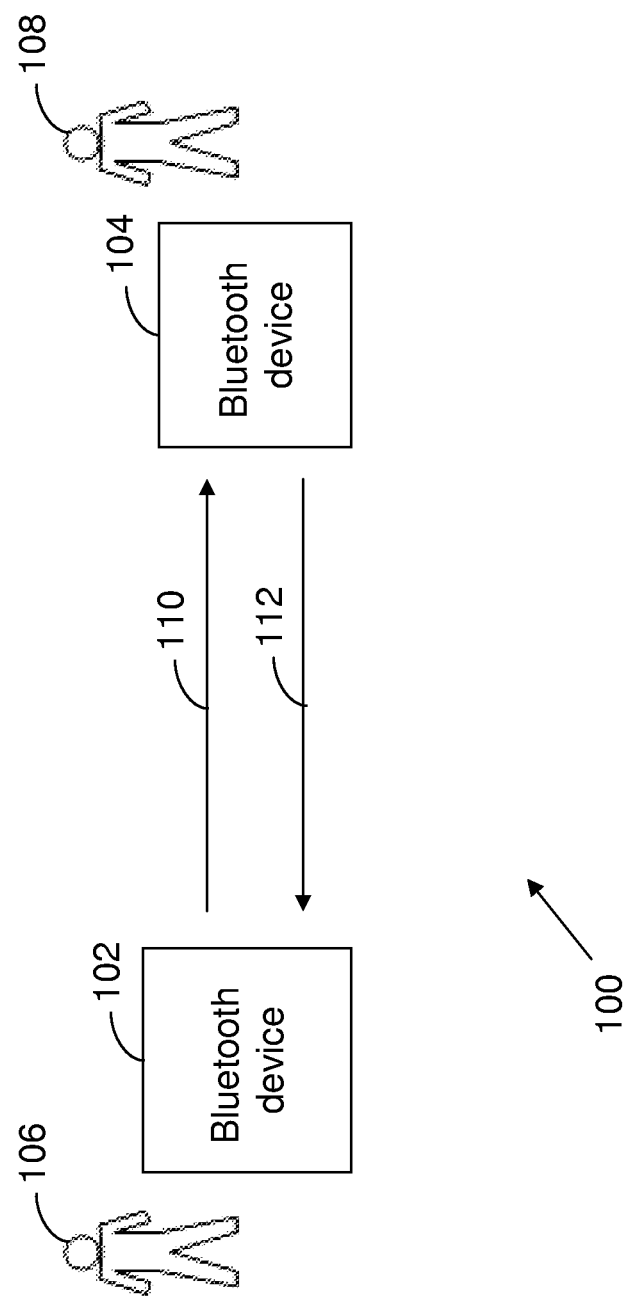
FIG. 1 shows an environment 100 in which the present invention can be practiced in accordance with an embodiment of the present invention.

FIG. 1 shows an environment 100 in which the present invention can be practiced, in accordance with an embodiment of the present invention. Environment 100 includes Bluetooth devices 102 and 104, hereinafter referred to as device 102 and device 104 respectively. Devices 102 and 104 are associated with users 106 and 108 respectively.

When user 106 wants to transfer data through Bluetooth technology, user 106 activates Bluetooth on device 102. As a result, device 102 transmits a Bluetooth signal 110 to query Bluetooth devices operating in its vicinity. As shown in the figure, device 104 is in the vicinity of device 102 and receives Bluetooth signal 110 transmitted by device 102. In accordance with various embodiments of the present invention, device 104 measures signal strength of Bluetooth signal 110 to calculate signal attenuation of Bluetooth signal 110.

After calculating the signal attenuation, device 104 compares the signal attenuation with a set of predefined threshold values. Based on the comparison, device 104 activates a corresponding service. As used herein, a service may refer to any of a Bluetooth profile such as the advanced audio distribution profile (A2DP), the basic imaging profile (BIP) and the like, an operating system service such as wireless networking, and custom application functionality such as a file transfer, exchange of electronic business cards, and so forth.

In other words, device 104 transmits Bluetooth signal 112 that broadcasts the corresponding service, and further activates the service, thereby enabling device 102 to discover the service. Device 102 measures the signal strength of Bluetooth signal 112 transmitted by device 104 and calculates the signal attenuation. Further, device 102 compares the signal attenuation with a set of predefined threshold values and activates a corresponding service. Thus, both devices 102 and 104 activate one or more corresponding services, thereby enabling automated exchange of data between the two devices. In accordance with an embodiment of the present invention, the number of services activated is inversely proportional to the signal attenuation. That is, more the signal attenuation, less the number of services activated and vice versa. The data being transferred may include any of a text file, an image, an audio file, a video file, binary data or combinations thereof.

In accordance with an embodiment of the present invention, both devices 102 and 104 transmit Bluetooth signals at a pre-specified signal strength level that has been mutually agreed upon. For example, the pre-specified signal strength level may be the maximum permitted power as specified by the class of the transmitting device. Thus, when device 102 receives Bluetooth signal 112 from device 104, it compares the signal strength of Bluetooth signal 112 with the maximum permitted power of device 104 and calculates the signal attenuation accordingly. In accordance with another embodiment of the present invention, device 102 challenges device 104 to transmit Bluetooth signal 112 at a specific signal strength level. Device 102 compares the signal strength of Bluetooth signal 112 transmitted by device 104 with the specific signal strength level to calculate the signal attenuation. As used herein, signal attenuation refers to the reduction in the signal strength of a signal during transmission. Methods for calculating the signal attenuation of a signal are well known in the art and therefore, are not discussed in detail in this description.

In accordance with an embodiment of the present invention, devices 102 and 104 are both in a discoverable mode before device 102 transmits a querying Bluetooth signal. In accordance with another embodiment, one of the devices, for example, device 104, may be in a non-discoverable mode. In this case, when device 104 receives Bluetooth signal 110 from device 102, device 104 compares the signal attenuation of Bluetooth signal 110 with the set of predefined threshold values. Based on the comparison, device 104 may choose to broadcast (or activate) its services and change to a discoverable mode or it may choose to stay in the non-discoverable mode and keep its services inactive. Thus, for example, when the signal attenuation is less than a maximum predefined threshold value, device 104 may activate one or more corresponding services and change to a discoverable mode.

Though the above description has been described with respect to two Bluetooth devices, it will be apparent to a person skilled in the art that more than two Bluetooth devices may also be involved. In accordance with an embodiment of the present invention, when more than one Bluetooth device responds to device 102, device 102 calculates the signal attenuation of each received Bluetooth signal and selects the Bluetooth device that transmitted the Bluetooth signal having the lowest signal attenuation. In accordance with an embodiment, device 102 may then transfer data to the selected Bluetooth device without the need for any manual intervention by user 104 using customary Bluetooth protocols. In accordance with another embodiment, device 102 displays a list of all the Bluetooth devices in its vicinity in a descending (or ascending) order of signal attenuation on its display. User 104 may then select any one of the Bluetooth devices to enable automated transfer of data.

It should be noted that each Bluetooth device measures the signal strength of a Bluetooth signal, calculates the signal attenuation using the signal strength and transmitted strength and compares the signal attenuation with a set of predefined threshold values. The set of predefined threshold values may be specific to each Bluetooth device. In accordance with an embodiment of the present invention, the predefined threshold values and the services associated with the predefined threshold values are configured by the user of the respective Bluetooth device. Examples of Bluetooth devices include, but are not limited to, a mobile phone, a personal digital assistant (PDA), a laptop, a personal computer, a printer, and a digital camera.

Figure 2:
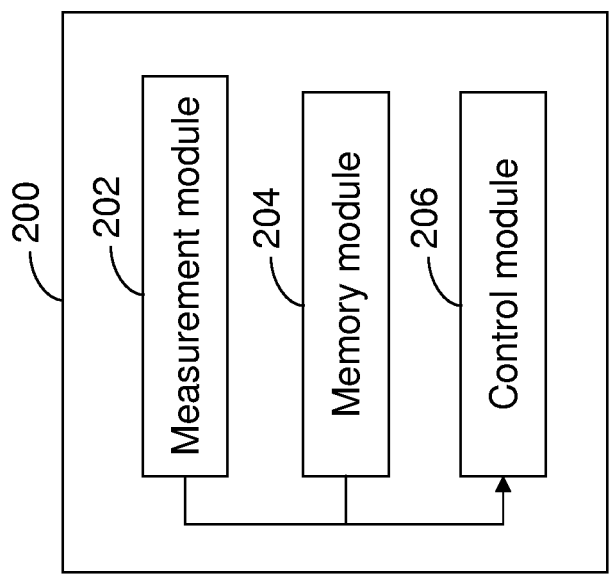
FIG. 2 is a block diagram of a Bluetooth device 200 in accordance with an embodiment of the present invention.

FIG. 2 is a block diagram of a Bluetooth device 200 in accordance with an embodiment of the present invention. Bluetooth device 200, hereinafter referred to as device 200, includes a measurement module 202, a memory module 204 and a control module 206.

In accordance with various embodiments of the present invention, measurement module 202 measures signal attenuation of a Bluetooth signal received by device 200. Memory module 204 stores a set of predefined threshold values and a list specifying a set of services associated with the set of predefined threshold values. Control module 206 compares the signal attenuation with the set of predefined threshold values and activates a corresponding service from among the set of services based on the comparison.

Measurement module 202 measures signal attenuation of a received Bluetooth signal. In accordance with an embodiment of the present invention, measurement module 202, under control of control module 206, is also capable of varying the signal strength of a Bluetooth signal before transmitting the Bluetooth signal. In accordance with an embodiment of the present invention, when device 200 receives a Bluetooth signal, measurement module 202 measures the signal attenuation of the Bluetooth signal by measuring the signal strength and provides the measured signal attenuation to control module 206. In accordance with various embodiments of the present invention, measurement module 202 measures the signal strength using a Received Signal Strength Indicator (RSSI) of the signal transmitted by the Bluetooth device and Link Quality (LQ) to calculate the signal attenuation.

Memory module 204 is a database that stores a set of predefined threshold values. Further, memory module 204 stores a list specifying a set of services associated with the predefined threshold values. In accordance with various embodiments of the present invention, the set of predefined threshold values are associated with the set of services supported by device 200 and specify threshold values for signal attenuation. As used herein, a service may refer to any of a Bluetooth profile, an operating system service and a custom applications supported by the Bluetooth technology. Thus, for example, memory module 204 may have a mapping table that includes signal attenuation values and corresponding to each signal attenuation value, one or more services that may be activated. The predefined threshold values in the mapping table may be specified in the form of ranges having a minimum value and a maximum value. It is also equally possible to have entries having only a maximum or a minimum value. In accordance with an embodiment of the present invention, the predefined threshold values are user-defined and are capable of being modified by the user.

Control module 206 receives the measured signal attenuation from measurement module 202. Control module 206 communicates with memory module 204 to identify the services corresponding to the measured signal attenuation. In accordance with various embodiments of the present invention, when there are no services corresponding to the measured signal attenuation, control module 206 keeps all services inactive. However, when there are one or more services corresponding to the measured signal attenuation, control module 206 activates the one or more corresponding services. In other words, control module 206, through a transceiver (not shown in the figure) may broadcast these services while responding to a received Bluetooth signal. The Bluetooth device receiving such a Bluetooth signal is thus able to discover and access only the broadcasted services. In accordance with an embodiment of the present invention, when there are multiple Bluetooth devices in the vicinity of device 200, control module 206 automatically selects the Bluetooth device for which the measured signal attenuation is minimum. Control module 206 then broadcasts and activates the corresponding services, which in turn, initiates automated transfer of data between device 200 and the selected Bluetooth device. In accordance with another embodiment, control module 206 generates a list of Bluetooth devices present in the vicinity of device 200 and presents the list on the display of device 200, in an ascending/descending order of signal attenuation. The user may then select any of the displayed Bluetooth devices for data transfer. Control module 206 may also highlight, on the display of device 200, the Bluetooth device having the least signal attenuation, thereby simplifying the job of the user.

Thus, when device 200 wants to transfer data to any neighboring Bluetooth device, device 200 transmits a query Bluetooth signal. The neighboring Bluetooth device receiving the Bluetooth signal calculates the signal attenuation of the Bluetooth signal. The neighboring Bluetooth device compares the signal attenuation with its set of predefined threshold values to determine a set of corresponding services that can be activated. The neighboring Bluetooth device then broadcasts and activates the corresponding services while transmitting a response Bluetooth signal. Device 200 receives the response Bluetooth signal, calculates the signal attenuation of the response Bluetooth signal and checks if the signal attenuation lies within its set of predefined threshold values. Device 200 then activates a corresponding service and automatically starts the data transfer without the need for any manual intervention. The data being transferred may include any of a text file, an image, an audio file, a video file, binary data or combinations thereof.

It is to be understood that the data transfer is carried out after pairing of the Bluetooth devices using customary Bluetooth protocols, as is known in the art. However, using the method and system described, the pairing may be performed automatically without the need for manual intervention. In accordance with an embodiment of the present invention, the pairing may be performed automatically only when the signal attenuation is less than a specific predefined threshold value. Thus, for example, when users of two Bluetooth devices are the only persons in a small room, the signal attenuation is low and hence the pairing may be performed automatically. However, for example, when the users are separated by more than few meters in an crowded space, the signal attenuation is high. Further, the users may want to retain control over the pairing process and hence, manual intervention may be utilized.

Figure 3:
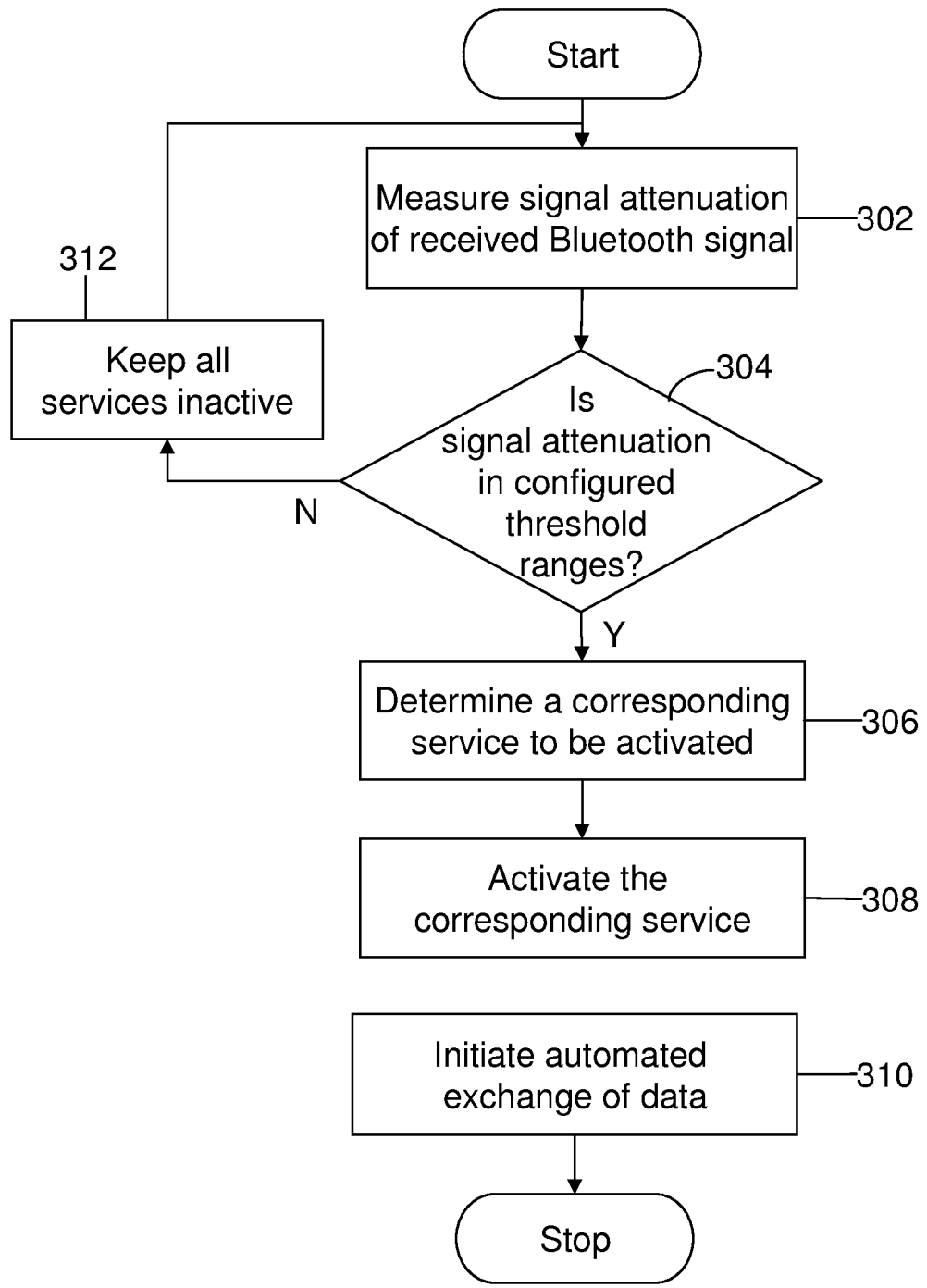
FIG. 3 is a flow chart describing a method for enabling discovery of services and automated exchange of data between Bluetooth devices in accordance with an embodiment of the present invention.

FIG. 3 is a flow chart describing a method for enabling discovery of services and automated exchange of data between two or more Bluetooth devices, in accordance with an embodiment of the present invention. At step 302, signal attenuation of a Bluetooth signal is calculated. At step 304, it is checked whether the signal attenuation is within configured threshold ranges. If the signal attenuation does not fall within the configured threshold ranges, at step 312, all supported services are kept inactive. In other words, the supported services are not broadcasted. However, if the signal attenuation is within the configured threshold ranges, at step 306, one or more corresponding services that need to be activated are identified. At step 308, the one or more corresponding services are activated and broadcasted through a Bluetooth signal. At step 310, automated exchange of data is initiated between the two Bluetooth devices.

Thus, using the method and system described above, a Bluetooth device may selectively broadcast the services that it supports based on the signal attenuation of a received Bluetooth signal. As will be appreciated by a person skilled in the art, the signal attenuation is used as a proxy to determine the proximity of two Bluetooth devices and depending on the proximity, one or more services are activated. That is, each Bluetooth device calculates its proximity with other Bluetooth devices operating in its vicinity by calculating the signal attenuation, and based on the device proximity, broadcasts and activates one or more of its services. This enables the two Bluetooth devices to discover the services of each other and exchange data. This may be useful in various scenarios.

Examples of scenarios where this invention may be practiced are provided below for better understanding.

Example 1

A user can configure his Bluetooth mobile so that when another Bluetooth mobile comes in close proximity of his Bluetooth mobile, his Bluetooth mobile automatically transfers his electronic business card to the other Bluetooth mobile.

Example 2

A Bluetooth server in a supermarket may be configured so that it automatically sends a Bluetooth coupon advertisement to a Bluetooth mobile only when the Bluetooth mobile is within, say, signal range of the Bluetooth server. However, the user of the Bluetooth device may have configured his Bluetooth mobile to receive Bluetooth coupon advertisements from any Bluetooth device only when the Bluetooth device is within close proximity Bluetooth mobile. In this case, the Bluetooth server will be able to transfer the Bluetooth coupon advertisement to the Bluetooth mobile only when the Bluetooth mobile is in close proximity, and not when the Bluetooth mobile is farther.

Thus, using the method and system described, a Bluetooth device may identify its proximity with another Bluetooth device by measuring the signal attenuation of the Bluetooth signal and may allow restricted/selective utilization of its services.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A method for enabling discovery of services and automated exchange of data between at least a first Bluetooth device and a second Bluetooth device, the method comprising:

at each of the first Bluetooth device and the second Bluetooth device,
measuring signal attenuation of a signal between the first Bluetooth device and the second Bluetooth device, wherein the signal is a Bluetooth signal;
comparing the signal attenuation of the Bluetooth signal with a set of user-configured predefined threshold values, wherein the set of predefined threshold values is associated with a set of services; and
activating a corresponding service from among the set of services based on the comparison, wherein activating the corresponding service enables discovery of the service and automated exchange of data between the first Bluetooth device and the second Bluetooth device, wherein the number of services activated is inversely proportional to the signal attenuation.

2. The method as recited in claim 1, wherein the data comprises at least one of a text file, an image, an audio file, a video file, binary data or combinations thereof.

3. The method as recited in claim 1, wherein the set of predefined threshold values is configured by a user.

4. The method as recited in claim 1, wherein the set of services associated with the set of predefined threshold values is configured by a user.

5. The method as recited in claim 1, wherein the set of services comprises at least one of a Bluetooth profile, an operating system service and a custom application.

6. The method as recited in claim 1, wherein both the first Bluetooth device and the second Bluetooth device are in a discoverable mode.

7. The method as recited in claim 1, wherein one of the first Bluetooth device and the second Bluetooth device is in a non-discoverable mode.

8. The method as recited in claim 1, wherein the Bluetooth signal is transmitted at a predefined signal strength level.

9. The method as recited in claim 1, wherein the first Bluetooth device and the second Bluetooth device comprise at least one of a mobile phone, a personal digital assistant (PDA), a laptop, a personal computer, a printer, and a digital camera.

10. A system for enabling discovery of services and automated exchange of data between a first Bluetooth device and a second Bluetooth device, the system comprising:

at each of the first Bluetooth device and the second Bluetooth device,
a measurement module for measuring signal attenuation of a signal between the first Bluetooth device and the second Bluetooth device, wherein the signal is a Bluetooth signal;
a memory module for storing:
a set of user-configured predefined threshold values; and
a list specifying a set of services associated with the set of predefined threshold values; and
a control module for:
comparing the signal attenuation with the set of predefined threshold values; and
activating a corresponding service from among the set of services based on the comparison, wherein activating the corresponding service enables discovery of the service and automated exchange of data between the first Bluetooth device and the second Bluetooth device, wherein the number of services activated is inversely proportional to the signal attenuation.

11. The system as recited in claim 10, wherein the data comprises at least one of a text file, an image, an audio file, a video file, binary data or combinations thereof.

12. The system as recited in claim 10, wherein the set of predefined threshold values is configured by a user.

13. The system as recited in claim 10, wherein the set of services associated with the set of predefined threshold values is configured by a user.

14. The system as recited in claim 10, wherein the set of services comprises at least one of a Bluetooth profile, an operating system service and a custom application.

15. The system as recited in claim 10, wherein both the first Bluetooth device and the second Bluetooth device are in a discoverable mode.

16. The system as recited in claim 10, wherein one of the first Bluetooth device and the second Bluetooth device is in a non-discoverable mode.

17. The system as recited in claim 10, wherein the Bluetooth signal is transmitted at a predefined signal strength level.

18. The system as recited in claim 10, wherein the first Bluetooth device and the second Bluetooth device comprise at least one of a mobile phone, a personal digital assistant (PDA), a laptop, a personal computer, a printer, and a digital camera.

19. A non-transitory computer storage device tangibly embodying a plurality of instructions adapted for enabling discovery of services and automated exchange of data between a first Bluetooth device and a second Bluetooth device, comprising:

a computer readable medium storing:
        a measurement module for measuring signal attenuation of a signal between the first Bluetooth device and the second Bluetooth device, wherein the signal is a Bluetooth signal;
        a memory module for storing:
            a set of predefined threshold values; and
            a list specifying a set of services associated with the set of user-configured predefined threshold values; and
        a control module for:
            comparing the signal attenuation with the set of predefined threshold values; and
            activating a corresponding service from among the set of services based on the comparison, wherein activating the service enables discovery of the service and automated exchange of data between the first Bluetooth device and the second Bluetooth device, wherein the number of services activated is inversely proportional to the signal attenuation.

20. The computer program product as recited in claim 19, wherein the set of services comprises at least one of a Bluetooth profile, an operating system service and a custom application.

21. The computer program product as recited in claim 19, wherein the data comprises at least one of a text file, an image, an audio file, a video file, binary data or combinations thereof.

22. The computer program product as recited in claim 19, wherein the first Bluetooth device and the second Bluetooth device comprise at least one of a mobile phone, a personal digital assistant (PDA), a laptop, a personal computer, a printer, and a digital camera.

\* \* \* \* \*